Figure 1:
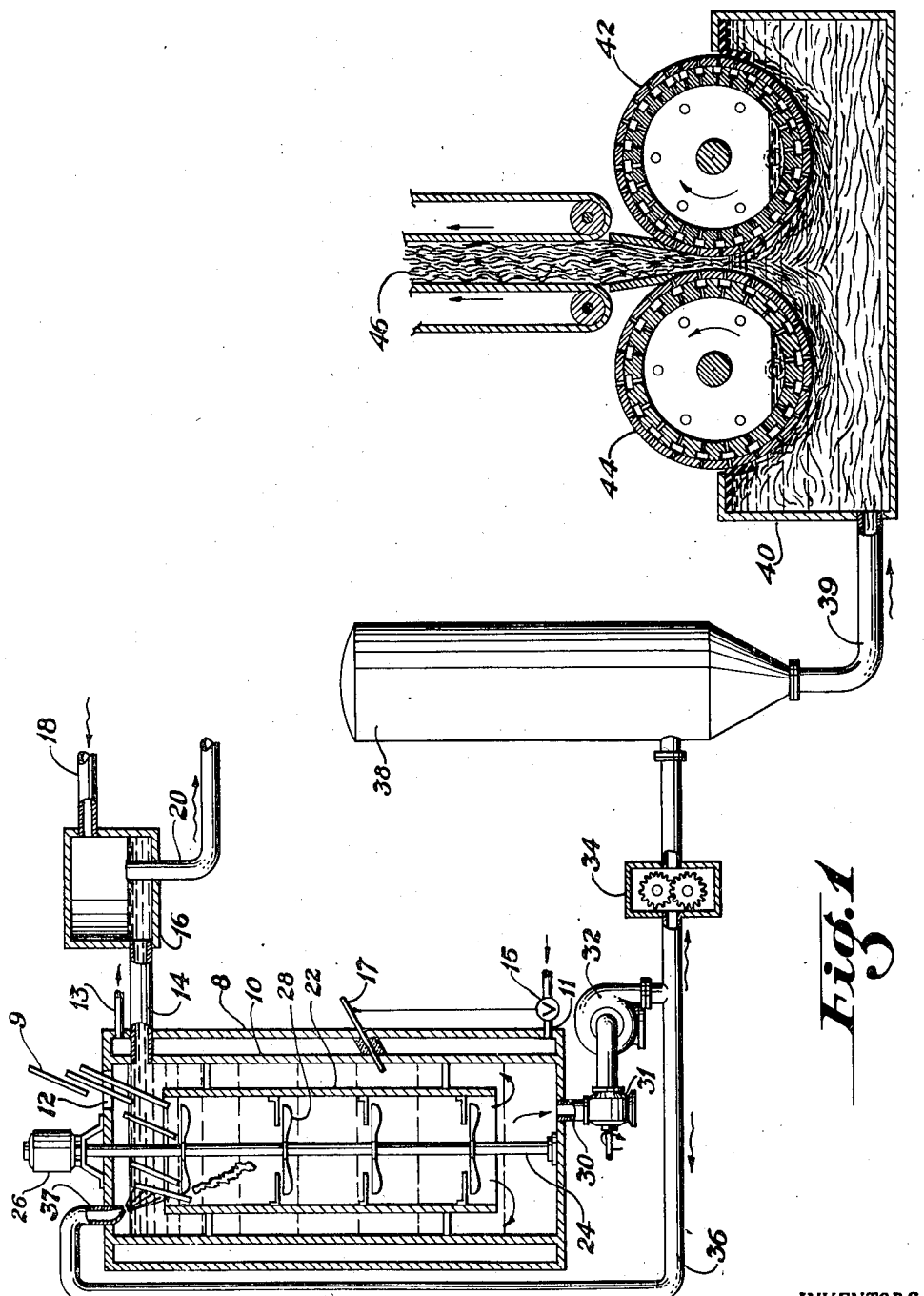

Nov. 2, 1948.  W. H. BRADSHAW ET AL  2,452,542
CONTINUOUS PROCESS FOR MAKING ALKALI CELLULOSE
Filed Oct. 27, 1942

INVENTORS
William H. Bradshaw
William R. Schmitz Jr.
BY
ATTORNEY

Patented Nov. 2, 1948

2,452,542

UNITED STATES PATENT OFFICE 2,452,542

CONTINUOUS PROCESS FOR MAKING ALKALI CELLULOSE

William H. Bradshaw, Wilmington, Del., and William R. Schmitz, Jr., Richmond, Va., assignors to E. I. du Pont de Nemours & Company, Wilmington, Del., a corporation of Delaware Application October 27, 1942, Serial No. 463,514

4 Claims. (Cl. 260—233)

1

This invention relates to the preparation of alkali cellulose. More particularly, it relates to an efficient and easily controlled process and apparatus for the preparation, in a continuous manner, of alkali cellulose of uniform composition, which alkali cellulose is eminently suited for conversion into a cellulose derivative, such as sodium cellulose xanthate for use in the viscose process.

Copending application, Serial No. 790,164, filed December 6, 1947, claims the apparatus described herein.

Although many attempts have been made to produce alkali cellulose in a continuous manner, such processes did not permit a sufficiently accurate control to produce alkali cellulose of uniform composition. Previous to this invention, the generally accepted method of producing alkali cellulose included the steps of steeping pressed sheets of cellulose, prepared from wood pulp or cotton linters, in an aqueous sodium hydroxide solution in a steeping press. The excess sodium hydroxide solution was then pressed from the steeped sheets, and the latter subsequently comminuted to the desired size.

It is an object of this invention to provide an improved process and apparatus for the continuous production of alkali cellulose of uniform composition.

Other objects of the invention will appear hereinafter.

The objects of this invention may be accomplished, in general, by continuously feeding cellulose into a slurry-forming receptacle, the feeding of cellulose being unavoidably subject to slight fluctuations in feeding rate, continuously adding sodium hydroxide solution to said receptacle at a substantially constant rate, withdrawing the slurry from the receptacle at a constant volume rate of slurry but with slight fluctuations of alkali cellulose content in the slurry, and continuously removing the alkali cellulose from the slurry at a constant volume rate of alkali cellulose, while permitting increase or decrease of the mass of slurry passing between the point where it is withdrawn from the receptacle and the point where the alkali cellulose is separated from the slurry.

The details of the present invention will be more clearly apparent by reference to the following detailed description when taken in connection with the accompanying illustration, in which, the figure is a diagrammatic side elevational view, with parts shown in section, of an apparatus suitable for use in accordance with the invention.

2

Referring to the drawing, reference numeral 10 designates a slurry-forming receptacle which is preferably provided with a temperature controlling jacket 8 and jacket inlet and outlet means 11 and 13 respectively. The jacket inlet means 11 may be provided with a throttling valve 15 controlled by a thermostatic temperature control 17. The receptacle 10 contains a cellulose feed inlet 12 and a sodium hydroxide solution inlet means 14. The inlet means 14 is connected to a constant level supply means 16 comprising a supply conduit 18 for the sodium hydroxide solution and an overflow conduit 20. By this means, sufficient solution will flow into the receptacle 10 to maintain the slurry therein at a constant level. The receptacle 10 is provided with a draft tube 22 in which is positioned a rotatable shaft 24. The shaft 24, which may be rotated by means of motor 26, contains a plurality of stirring and cellulose disintegrating blades 28. The blades 28 cooperate with bars or blades on the internal periphery of the draft tube 22 to tear and disintegrate the cellulose material and force the resulting slurry of alkali cellulose through the bottom of the draft tube 22. A portion of the slurry will pass upwardly between the tube 22 and receptacle 10 to be again forced down through the draft tube. Another portion of the slurry will be drawn through slurry outlet 30 by means of centrifugal pump 32. An agitating device 31 may, if necessary, be positioned between outlet 30 and pump 32. The agitating device 31 will disintegrate any remaining pieces of cellulose substantially into its fibrous state and thoroughly mix the same into the slurry. If desired, the device 31 may be provided with a screen, having for example a ¼ inch mesh, to insure the formation of a substantially fibrous slurry mass.

The pump 32 passes a minor portion of the slurry to metering device 34 and a major portion of the slurry through conduit 36 back to the top of the receptacle 10. A nozzle 37 is positioned on the end of conduit 36 so as to pass the slurry into the receptacle with considerable force. Any sheets of cellulose passing under nozzle 37 will thereby be forced into draft tube 22 to be disintegrated therein.

The metering device 34 may consist of a constant volume gear pump and is connected to a fluctuating volume slurry receiver 38. A conduit 39 connects the bottom of receiver 38 to a slurry separating container 40. The container 40 is provided with slurry separating rolls 42 and 44 which are adapted to press the slurry forced in contact therewith to separate the solid alkali cellulose from the sodium hydroxide solution. The slurry separating container 40 is preferably constructed in the manner described in the copending patent application of William R. Schmitz, Jr., Serial No. 338,443, filed June 1, 1940, now U. S. Patent 2,308,031. The slurry press rolls 42 and 44 are sealed in the container 40 to permit the slurry in the container to be maintained under pressure. The slurry press rolls when rotating at a given peripheral speed will pass a substantially constant volume of the solid alkali cellulose per unit of time, regardless of slight fluctuations in the alkali cellulose content of the slurry. With the alkali cellulose being fed to the press rolls 42 and 44 at a substantially constant rate, the pressed alkali cellulose 46 will contain a substantially constant percentage of sodium hydroxide solution.

The above described device will operate substantially as follows:

Cut sheets 9 of cellulose, or any other desired form of cellulose, are fed to the slurry-forming receptacle 10 at a feeding rate maintained as uniform and constant as possible. This may, for example, be done by feeding the sheets by hand or by feeding apparatus of the type described in Schmitz Patent No. 2,253,140. Such feeding of cellulose is, however, always subject to slight fluctuations in feeding rate as will appear later herein. Sodium hydroxide is passed into the receptacle 10 by means of a constant level supply device 16. By means of such a device, sufficient sodium hydroxide is constantly added to the slurry-forming receptacle to maintain the level of the slurry in the latter substantially constant. As the cellulose is fed into the receptacle, it is guided into the draft tube 22 in which the cellulose will be drawn by means of the comminuting blades 28, which are rotated by means of motor 26 and shaft 24. The cellulose will be torn and disintegrated and thoroughly mixed with the sodium hydroxide solution to form a fibrous slurry mass of alkali cellulose. A portion of the slurry will be passed from the bottom of the draft tube upwards between the draft tube and the receptacle to again flow through the draft tube. Another portion of the slurry will be drawn from the outlet 30 of the receptacle by means of centrifugal pump 32. A portion of this withdrawn slurry is passed to a constant volume metering device 34 and a major portion of the slurry is passed into conduit 36 to be recirculated through the receptacle 10. The conduit 36 is provided with a nozzle 37 positioned above the draft tube 22 to force the recirculated slurry into the receptacle with sufficient force to press cellulose contained in the top of the receptacle down into the draft tube to be disintegrated therein. Preferably, a heating or cooling fluid is passed through jacket 8 to maintain the temperature of the slurry constant. The quantity of fluid passed through the jacket is automatically regulated by throttling valve 18 and thermostatic control 17.

The constant volume metering device 34 passes a constant volume of slurry per unit of time into a fluctuating volume container 38. Although the volume of slurry passed per unit of time by the metering device will be constant, the alkali cellulose content of the slurry will fluctuate due to the above mentioned fluctuations in the feeding rate of the cellulose into the receptacle. The slurry mass forwarded by the metering device 34 flows through fluctuating volume container 38 and into a slurry separating container 40. The slurry is passed into the container 40 under a certain amount of pressure, preferably of the order of 10 to 20 pounds per square inch. The slurry in the container 40 will be forced against rotating slurry press rolls 42 and 44, thereby depositing a mat of alkali cellulose on the rolls and filtering liquid caustic therefrom. Upon rotation, the press rolls will press the remaining liquid sodium hydroxide from the solid alkali cellulose to the desired alkali cellulose to liquid caustic ratio. The slurry press rolls 42 and 44 are sealed in the container 40 to permit the slurry contained therein to be maintained under the above mentioned pressure. The slurry press rolls are substantially non-yielding relative to each other and therefore, when rotating at a constant speed, pass a substantially constant, uniform volume of alkali cellulose per unit of time, regardless of the fluctuating content of alkali cellulose in the slurry. As the alkali cellulose content of the slurry is slightly increased, the thickness of the deposited mat of alkali cellulose on the press rolls is increased, thereby slowing down the filtration therefrom of liquid caustic. As a result, there will be an increase in the total slurry volume between the metering device 34 and the press rolls 42 and 44. This additional volume is temporarily stored in the fluctuating volume receiver 38 with an accompanying increase in pressure therein. As the alkali cellulose content of the slurry is subsequently decreased, the stored amount of slurry in the receiver 38 is gradually forwarded to the container 40, thus compensating for fluctuations in alkali cellulose content of the slurry and in turn compensating for fluctuations in the feeding rate of the cellulose.

As above repeatedly stated, it is practically impossible to feed the cellulose to the receptacle at a constant rate of feed since cellulose sheets contain slight non-uniformities in weight of cellulose. Furthermore, such sheets of cellulose frequently vary in the moisture content therein. For this reason, it has been exceedingly difficult heretofore to produce alkali cellulose of uniform composition by a continuous process.

In accordance with the essential features of the present invention, an alkali cellulose slurry is continuously formed by feeding, into a slurry-forming receptacle, cellulose and sodium hydroxide solution with a feeding rate maintained as uniform and constant as is practically possible, but always with the above mentioned unavoidable slight fluctuations in feeding rate of the cellulose. The formed alkali cellulose slurry is continuously removed at a constant volume rate by a metering gear pump or the like. The metered constant volume of slurry removed from the receptacle will, of course, contain slight fluctuating amounts of alkali cellulose corresponding to the slight fluctuations in said feeding rate of cellulose. The fluctuations in alkali cellulose content of the slurry naturally will not exactly correspond to the fluctuations in feeding rate of cellulose, since the slurry is continuously being formed in a receptacle of considerable size.

The slurry press rolls when operating at a given peripheral speed will pass alkali cellulose at a substantially constant volume of alkali cellulose regardless of the fluctuations of the alkali cellulose content of the slurry being pressed. When a slightly thicker slurry is being passed into the slurry separating container, due to a slightly increased feeding rate of cellulose, the total volume of slurry being pressed per unit of time by the slurry press rolls will be decreased and the pressure will build up in the slurry separating container. It is therefore necessary to have a fluctuating volume receiver 38 between the metering device 34 and the slurry press rolls 42 and 44. This receiver must be of such a size as to permit the increase and decrease of the total volume of slurry contained between the metering device and press rolls to compensate for the maximum fluctuations which will occur in the feeding rate of the cellulose and/or sodium hydroxide solution. As a general rule the fluctuating volume receiver should have a capacity at least equal to the total volume passed by the metering device in one minute.

The constant level supply means for feeding sodium hydroxide to the receptacle 10 may be a conventional float-controlled constant level supply device, or any other conventional means for feeding sufficient sodium hydroxide solution to maintain constant the level of the slurry in the slurry-forming receptacle. Although much less desirable from a practical operating viewpoint, the sodium hydroxide may be supplied to the receptacle 10 at a constant metered rate, and such a method and apparatus is considered to be within the broad concept of the present invention.

Obviously, numerous other changes and modifications can be made in the details of the specifically illustrated and described apparatus without substantially departing from the nature and spirit of the invention. For example, although it is much to be desired, temperature control means, which is present for the purpose of avoiding changes in swelling characteristics of alkali cellulose, may, under certain conditions, be dispensed with. Similarly, the means for re-circulating the slurry mass from the receptacle by means of conduit 36 may be dispensed with, if other means are provided to produce a uniform slurry mass in the receptacle.

Although the invention has been described with particular reference to the feeding of cellulose in sheet form, obviously, the cellulose may be in any other desired form, for example; in the form of a continuous web or roll or even in the form of bulk pulp, wet pulp, or a thickened slurry obtained from a pulp mill.

In accordance with the present invention, alkali cellulose of uniform composition and containing a uniform percentage of residual sodium hydroxide solution can be produced in a continuous manner despite the fact that it is practically impossible to feed cellulose to a slurry-forming receptacle in a constant rate per unit of time. The present invention furthermore, provides a process and apparatus which overcome a number of objections and limitations of previously known processes and apparatus. By the process of the present invention, it is possible to use cellulose of somewhat varying characteristics and it has been found possible to use a sodium hydroxide solution containing higher percentages of hemicellulose than has been possible with processes known prior to the present invention.

By means of the present invention, it is possible to increase or decrease the average time of reacting the cellulose with the caustic soda solution, or increase or decrease the viscosity of the slurry by merely altering the rate of metering of the slurry to the press rolls, without any change in the rate of feed of the cellulose or the speed of the press rolls.

Since it is obvious that many changes and modifications can be made in the details above described without departing from the nature and spirit of the invention, it is to be understood that the invention is not to be limited to the above details except as set forth in the appended claims.

We claim:

1. In a process for the continuous production of alkali cellulose of uniform composition the steps comprising continuously feeding cellulose into a slurry-forming receptacle, said feeding being subject to unavoidable slight fluctuations in feeding rate, continuously feeding sodium hydroxide solution to said receptacle at a substantially constant rate, continuously withdrawing alkali cellulose slurry from said receptacle at a substantially constant volume rate, said withdrawn alkali cellulose slurry containing slightly fluctuating amounts of alkali cellulose as a result of fluctuations in the feed rate of cellulose, continuously removing alkali cellulose, containing a predetermined constant percentage of sodium hydroxide solution, from the alkali cellulose slurry at a substantially constant volume rate and while maintaining said slurry under superatmospheric pressure, and between the steps of withdrawing said slurry and removing alkali cellulose therefrom permitting a fluctuating increase and decrease in the volume of the slurry to compensate for the slightly fluctuating amounts of alkali cellulose in the slurry being withdrawn from said receptacle.

2. In a process for the continuous production of alkali cellulose of uniform composition the steps comprising continuously feeding cellulose into a slurry-forming receptacle, said feeding being subject to unavoidable slight fluctuations in feeding rate, continuously feeding sufficient sodium hydroxide solution to said receptacle to maintain the level of slurry therein substantially constant, continuously withdrawing alkali cellulose slurry from said receptacle at a substantially constant volume rate, said withdrawn alkali cellulose slurry containing slightly fluctuating amounts of alkali cellulose as a result of fluctuations in the feeding rate of the cellulose, continuously removing alkali cellulose, containing a predetermined constant percentage of sodium hydroxide solution, from the alkali cellulose slurry at a substantially constant volume rate and while maintaining said slurry under superatmospheric pressure, and between the steps of withdrawing said slurry and removing alkali cellulose therefrom permitting a fluctuating increase and decrease in the volume of the slurry to compensate for the fluctuating amounts of alkali cellulose in the slurry being withdrawn from said receptacle.

3. In a process for the continuous production of alkali cellulose of uniform composition the steps comprising continuously feeding cellulose into a slurry-forming receptacle, said feeding being subject to unavoidable slight fluctuations in feeding rate, continuously feeding sufficient sodium hydroxide solution to said receptacle to maintain the level of slurry therein substantially constant, maintaining the temperature of the slurry in said receptacle substantially constant, continuously withdrawing alkali cellulose slurry from said receptacle at a substantially constant volume rate, said withdrawn alkali cellulose slurry containing slightly fluctuating amounts of alkali cellulose corresponding to fluctuations in the feeding rate of the cellulose, continuously removing alkali cellulose, containing a predetermined constant percentage of sodium hydroxide solution, from the alkali cellulose slurry at a substantially constant volume rate and while maintaining said slurry under superatmospheric pressure, and between the steps of withdrawing said slurry and removing alkali cellulose therefrom permitting a fluctuating increase and decrease in the volume of the slurry to compensate for the fluctuating amounts of alkali cellulose in the slurry being withdrawn from said receptacle.

4. In a process for the continuous production of alkali cellulose of uniform composition the steps comprising passing from a receptacle an alkali cellulose slurry containing slightly fluctuating amounts of alkali cellulose at a substantially constant volume rate, continuously removing alkali cellulose, containing a predetermined constant percentage of sodium hydroxide solution, from said alkali cellulose slurry at a substantially constant volume rate and while maintaining said slurry under superatmospheric pressure, and between the steps of passing said slurry and removing alkali cellulose therefrom permitting a fluctuating increase and decrease in the volume of the slurry to compensate for the slightly fluctuating amounts of alkali cellulose in the slurry.

WILLIAM H. BRADSHAW.
WILLIAM R. SCHMITZ, Jr.

REFERENCES CITED

The following references are of record in the file of this patent:

UNITED STATES PATENTS

| Number | Name | Date |
|---|---|---|
| 1,653,124 | Richter | Dec. 20, 1927 |
| 1,672,249 | Ellis | June 5, 1928 |
| 1,801,782 | Richter | Apr. 21, 1931 |
| 2,005,811 | Steimmig | June 25, 1935 |
| 2,218,836 | Kornegg | Oct. 22, 1940 |
| 2,263,888 | Richter | Nov. 25, 1941 |
| 2,274,463 | Stoeckly et al. | Feb. 24, 1942 |

FOREIGN PATENTS

| Number | Country | Date |
|---|---|---|
| 413,511 | Germany | May 11, 1925 |